Dec. 17, 1946.  J. C. JAQUES  2,412,705
PORTABLE SAW
Filed June 14, 1946  3 Sheets-Sheet 1
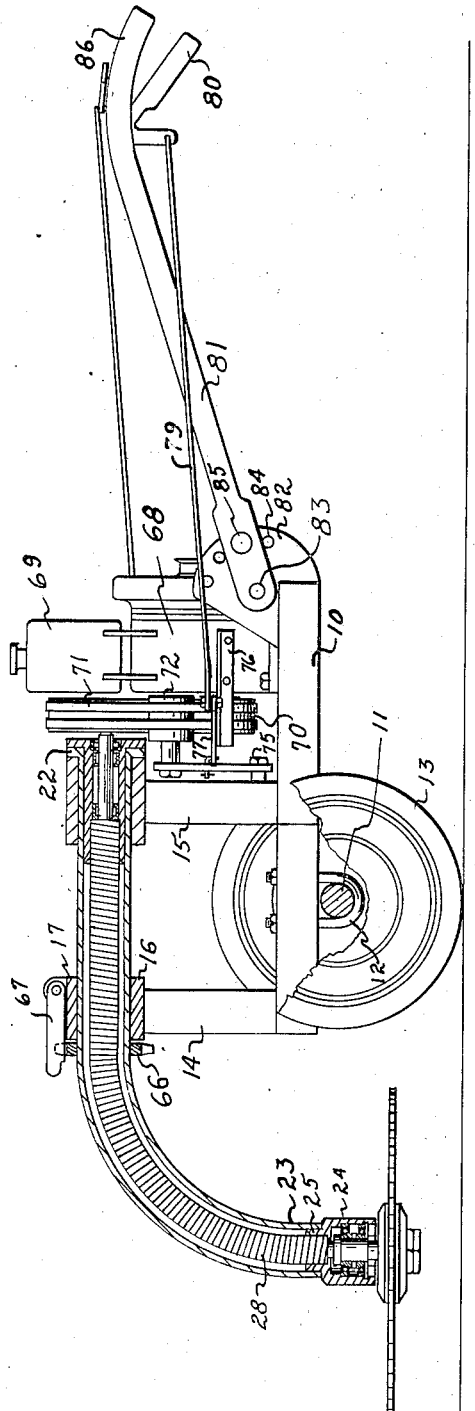
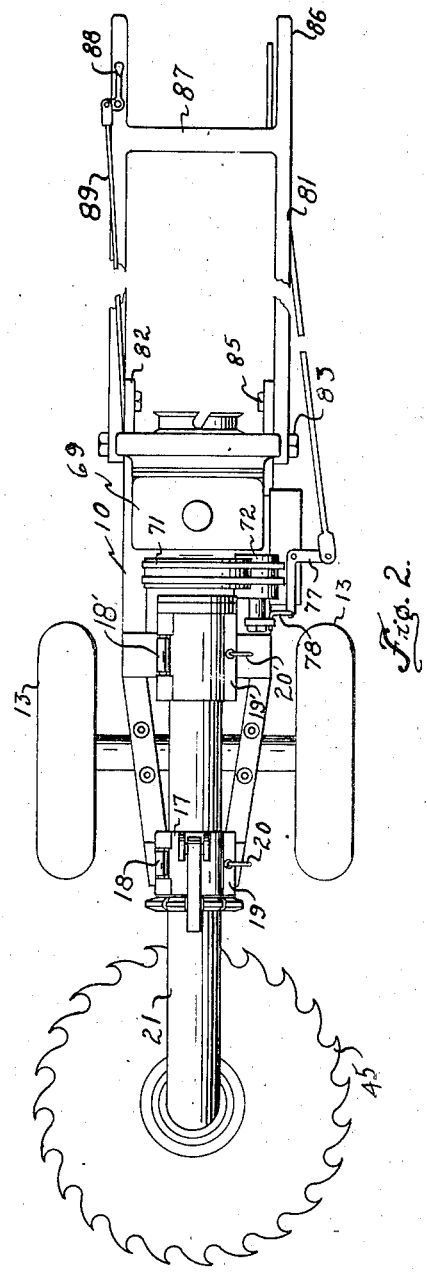
JOHN C. JAQUES
*INVENTOR.*
BY *Schley and Schley*
ATTORNEYS Dec. 17, 1946.  J. C. JAQUES  2,412,705
PORTABLE SAW
Filed June 14, 1946   3 Sheets-Sheet 2

JOHN C. JAQUES
*INVENTOR.*

BY  Schley and Schley

ATTORNEYS

JOHN C. JAQUES
*INVENTOR.*

BY Schley and Schley

ATTORNEYS

Patented Dec. 17, 1946

2,412,705

UNITED STATES PATENT OFFICE 2,412,705

PORTABLE SAW

John C. Jaques, Denison, Tex.

Application June 14, 1946, Serial No. 676,767

5 Claims. (Cl. 143—43)

This invention relates to new and useful improvements in portable saws.

The present invention is directed to improvements and simplifications relating to the portable saw disclosed in my copending application, Serial No. 648,351, filed February 18, 1946.

An important object of this invention is to provide an improved portable saw, including the type of saw known as a one man power saw, wherein a flexible drive shaft is provided for rotating the saw blade, whereby complicated gearing and shafting, along with the expense involved in manufacturing such elements, is eliminated.

Another object of the invention is to provide an improved saw of the type described which is simple and compact in construction and wherein the saw blade carrying member is formed to eliminate bulkiness in the cutting section of the structure so that relatively inaccessible points may be reached with comparative ease by the operator of the saw.

A still further object of the invention is to provide an improved portable saw having a unitary housing enclosing the drive shaft for the saw blade and extending from the driving source to the saw in a substantially continuous manner.

Yet another object of the invention is to provide an improved portable saw which is compact in structure and efficient in operation, and which possesses many advantages over similar saws developed heretofore.

A construction designed to carry out the invention will be hereinafter described together with other features of the invention.

Figure 6:
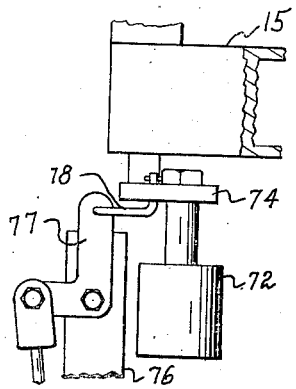
Figure 3:
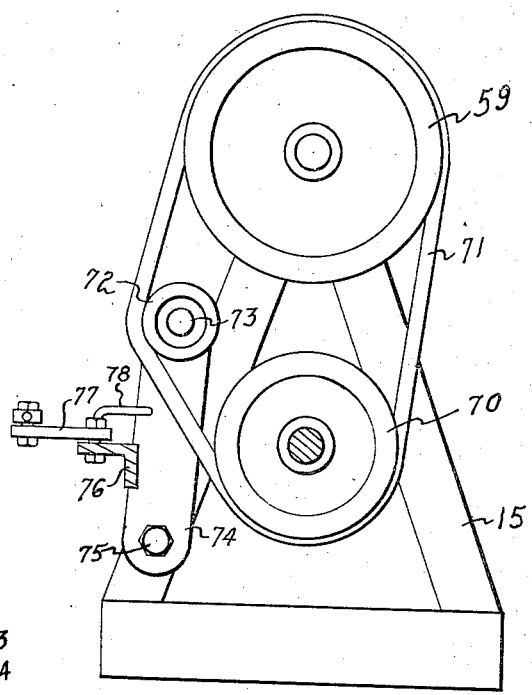
Figure 4:
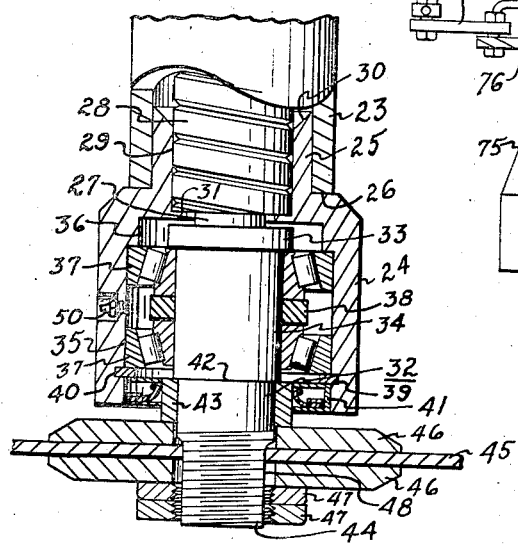
Figure 5:
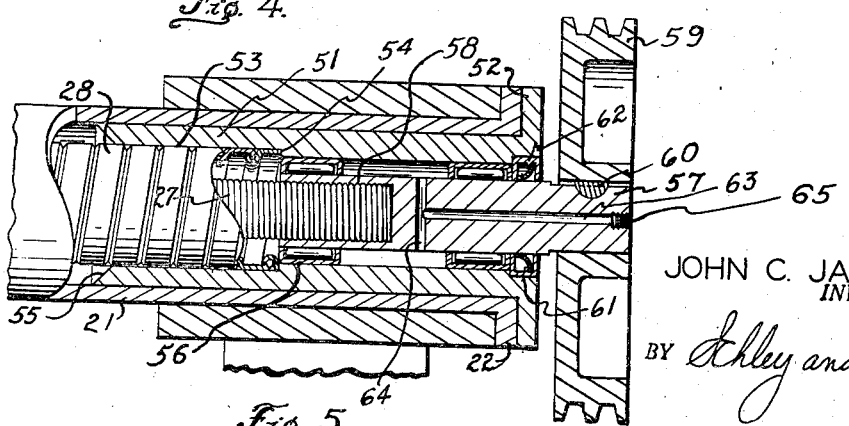
Figure 9:
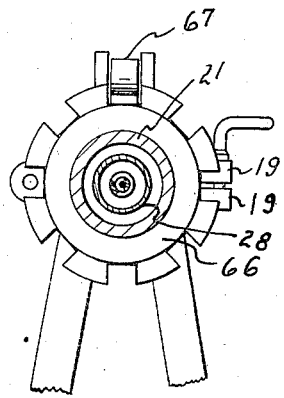
Figure 7:
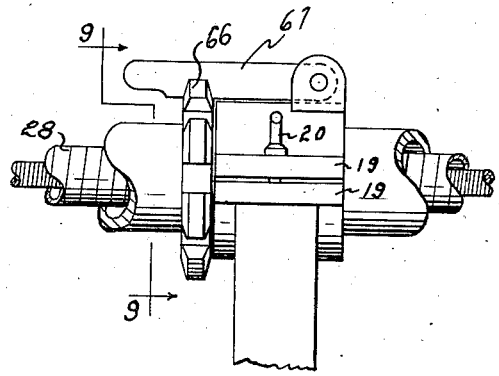
Figure 10:
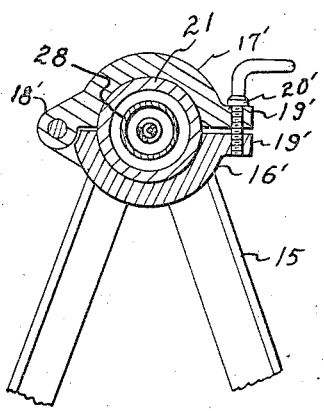
Figure 8:
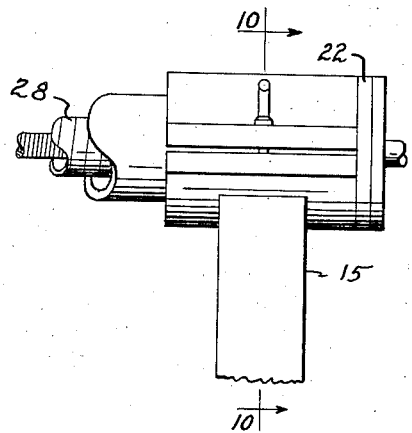

The invention will be more readily understood from a reading of the following specification and by reference to the accompanying drawings, wherein an example of the invention is shown, and wherein:

Fig. 1 is a side elevation of a portable saw constructed in accordance with this invention, portions of the view being broken away to more clearly show the structure of the saw, Fig. 2 is a plan view, Fig. 3 is an enlarged, vertical, sectional view, showing the driving connection between the drive shaft and the engine, Fig. 4 is an enlarged, vertical, sectional view of the bearing mounting for the lower end of the drive shaft, Fig. 5 is an enlarged, vertical, sectional view, partly in elevation, showing the details of the bearing construction for the upper end of the drive shaft, Fig. 6 is a fragmentary view taken on a horizontal plane and showing the details of the idler pulley linkage, Fig. 7 is a side elevation of the front torque tube support, Fig. 8 is a side elevation of the rear torque tube support, Fig. 9 is a vertical, cross-sectional view, taken on the line 9—9 of Fig. 7, and Fig. 10 is a vertical, cross-sectional view, taken on the line 10—10 of Fig. 8.

In the drawings, the numeral 10 designates a horizontal frame which converges toward its front end. Between the transverse center of the frame and its front end, said frame is secured on a transverse axle 11 by U-bolts 12. Ground wheels 13 are provided at either end of the axle 11 for movably supporting said frame. It is to be noted that the axle 11 is positioned well forward of the transverse center of the frame for reasons to be pointed out hereinafter. A bipod front standard 14 is fastened on the front end of the frame and a pipod rear standard 15 is secured on the frame substantially at the transverse center thereof.

The front standard 14 has a semi-circular clamp or collar member 16 secured to its upper end and a complementary clamp member 17 is hinged thereto at 18. See Figures 7 and 9. The members 16 and 17 constitute a split clamping collar. The collar members 16 and 17 have complementary longitudinal lips 19. A screw-threaded linch pin 20 is screwed through the lips. By swinging the handle of the pin, the collar members are tightened or loosened about a torque tube 21 extending through the collar.

The rearward end of the torque tube is supported in a collar member 16' similar to the member 16 and secured on the upper end of the rear standard 15. See Figures 8 and 10. The upper collar member 17' is hinged to the member 16' at 18' and both members have lips 19' connected by a linch pin 20', whereby the torque tube may be clamped or loosened. The rear end of the tube is formed with an outwardly-directed annular flange 22 which abuts the rear end of the adjacent clamping collar. The forward portion of the tube curves downwardly through ninety degrees so that the extreme forward end 23 of the tube extends at right angles to the rear end of the tube.

A cylindrical bearing box 24 has its upper end reduced to form an axial sleeve 25 and a shoulder 26. The sleeve 25 has a press fit within the lower end 23 of the torque tube, the lower extremity of the tube abutting the shoulder 26 so that the bearing box is rigidly secured to the lower end of the torque tube and extends axially thereof. See Figure 4.

A flexible drive shaft 27 extends throughout the length of the torque tube 21, and is enclosed within a flexible tube 28. The sleeve 25 is formed with an axial bore 29 and the flexible tube 28 has a press fit therein, the upper end of the pin being beveled at 30 to facilitate the positioning of the flexible tube within said bore. An annular internal flange 31 is provided at the lower end of the bore 29 abutting the lower extremity of the tube 28. The shaft extends below the flange 31 and has secured to its lower end a spindle 32 provided with an outwardly directed annular flange 33 at its upper end and a bearing face 34.

The bearing box 24 is provided with an enlarged axial bore 35 which is reduced at its upper end to form a circular recess 36 within which the flange 33 is positioned. A pair of roller bearings 37, separated by a ring 38, are positioned within the bore 35 and engage the bearing face 34 of the spindle 32. The uppermost bearing 37 engages the shoulder formed by the reduced upper portion of the bore 35, and a circular snap ring 39 engages beneath the lower bearing within an annular groove 40 provided in the lower wall of the bore 35 to prevent downward movement of the bearings and the divider ring 38. An oil collector ring 41, which may be any desired type or construction, is positioned in the extreme lower end of the bore 35 below the snap ring 39 to retain lubricant within the bearing box.

The spindle 32 is reduced in diameter below the bearing face to form a shoulder 42, and a spacer ring 43 encircles the reduced portion of the spindle, the upper end of the ring abutting said shoulder. A screw-threaded pin 44 is provided beneath the ring 43 upon the spindle and a circular saw blade 45, of any desirable type or design, is positioned on said pin. A pair of beveled plates 46 engage upon the pin on either side of the saw 45, the upper plate abutting the spacer ring 43, and a pair of retaining nuts 47 engage the pin beneath the lower plate 46 to securely fasten the saw upon the pin and the spindle 32. The pin is milled away at diametrically-opposed sides to form flat faces 48 thereon, and the saw carries complementary splines (not shown) for engaging the faces 48 so that the saw is splined to the pin and rotation of the saw with respect to the pin is prevented. A grease fitting 50 is recessed in one side wall of the bearing box 24 so that lubricant may be supplied to the bearings 37.

At the upper end of the torque tube 21, a gland 51, which engages within the upper end of the tube, is provided, said gland carrying upon its outer end an outwardly-directed annular flange 52 which abuts the flange 22 formed on the torque tube. See Figure 5. The shank of the gland has a snug fit within the tube 21, and the upper end of the flexible tube 28 has a press fit within the bore 53 of said gland, the bore being reduced in diameter to form a shoulder 54 against which the upper extremity of the flexible tube 28 abuts. The forward edge of the gland is beveled at 55 to facilitate insertion of the flexible tube into the bore of the gland. A pair of roller bearings 56 are positioned in the reduced portion of the bore 53 to support a stub shaft 57. The shaft 57 is formed at its forward end with a circular recess 58 within which the upper end of the flexible drive shaft 27 has a press fit so that the stub shaft and flexible shaft revolve as a unit. The shaft 57 projects beyond the rear end of the gland 51 and carries a double-grooved pulley 59 secured to said projecting portion by a suitable key 60. The bore 53 is enlarged or counterbored at its extreme rear end to provide an annular groove 61, and a suitable oil-retaining ring 62 is positioned within said groove so as to encircle the stub shaft 57 and retain lubricant within the space surrounding said shaft. The shaft carries a small axial bore 63 extending forwardly from the rear end of the shaft and terminating in a transverse passage 64 provided at a point spaced rearwardly from the bottom of the recess 58. A suitable grease fitting 65 is mounted in the outer end of the bore 63 so that lubricant may be supplied through the bore 63 and the passage 64 to the bearings 56.

While the saw is shown in the drawings in a horizontal position, it may be disposed vertically or at various angles by rotating the torque tube 21. The linch pins 20 and 20' may be rotated to loosen the clamping collars and allow such rotation of the tube. A notched collar 66 is secured on the tube contiguous to the front edges of the collar members 16 and 17, and a latch 67 is pivoted on the member 17. The latch is adapted to engage within the notches carried by the collar 66 to hold the torque tube against rotation when said tube has been rotated to the desired position. The linch pins 20 and 20' may then be rotated to tighten the clamping collar and anchor the tube securely at the desired angle.

A power plant in the form of a gasoline engine 68 and a fuel tank 69 is mounted on the rear end of the frame 10. A double-grooved drive pulley 70, fastened on the end of the shaft, is somewhat less in diameter than the pulley 59 secured to the saw drive shaft. Suitable V-belts 71 connect the pulleys 70 and 59. These belts are of such length as to require a belt tightener to make them track in the grooves of the pulley. An idler pulley 72 journaled on a shaft 73 extending rearwardly from the upward end of a tightener arm 74 engages the inner faces of the belts. See Figures 3 and 6. The arm is pivoted at its lower end on a stud 75 extending from the side of the standard 15. A forwardly extending bracket 76 is secured to one side of the engine 68 and a bell crank lever 77 is pivoted on this bracket; the forward end of said lever being connected to the tightener arm by an angular link 78, and the pitman 79 of a band lever 80 being pivoted to the opposite end of said lever.

A pair of rearwardly-extending handle bars 81 have their forward ends attached to segment plates 82, fastened on each side of the rear end of the frame 10, by bolts 83. Each plate has a plurality of holes 84 spaced equidistantly from the bolts 83. Bolts 85 extending through the handle bars are engaged in the holes to fasten said bars at various inclinations. The bars have hand grips 86 at their rear ends and are connected by a bridle bar 87.

The hand lever 80 is pivoted to the left-hand handle bar and an angular throttle lever 88 is pivoted on the bar 87 adjacent the grip of the right-hand handle bar 81 (Fig. 2). The rear end of a throttle rod 89 is pivoted to the lever 88, while the forward end is attached to the throttle of the engine (not shown). When the engine 68 is running, the belts 71 will be loose and motion will not be imparted to the pulley 59 until the belts are tightened by the idler pulley 72. Therefore, a clutch is not required. To drive the saw 45, the operator merely has to squeeze the hand lever 80 toward the grip 86, which will pull the pitman 79 rearwardly, thereby actuating the lever 77 to swing the arm 74 outwardly and cause the idler pulley 72 to tighten the belts 71.

The utilization of a belt drive is of advantage to protect the saw against damage. If the saw blade should stall for any reason, the belts would slip and protect the driving mechanism from serious damage. Also, by controlling the pressure exerted upon the hand lever 80, the speed of rotation of the saw may be controlled to a certain extent.

As pointed out hereinbefore, the axle 11 is positioned somewhat forward of the transverse center of the frame 10. The weight of the saw and torque tube, being positioned forwardly of said axle, tends to counterbalance, substantially, the weight of the engine 68 and the adjacent driving mechanism. The entire saw is thus well balanced so that the operator may handle the unit with ease and with a minimum of fatigue.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A portable saw including, a frame mounted on ground wheels, a pair of upstanding standards spaced longitudinally on the frame, clamps on the upper ends of the standards, a longitudinally arcuate torque tube secured in said clamps and overhanging the front end of the frame, a circular saw suspended from the front end of the tube, flexible saw driving means extending through the tube connected with the saw, an engine mounted on the frame in rear of the standards, a belt drive between the engine and the saw driving means, a handle bar extending rearwardly from the frame, a belt tightener mounted on the frame having a pulley engaging the belt drive, and actuating means mounted on the handle bar connected with the belt tightener.

2. A portable saw including, a frame mounted on ground wheels, a pair of upstanding standards spaced longitudinally on the frame, clamps on the upper ends of the standards, a torque tube secured in said clamps and overhanging the front end of the frame at least the overhanging portion of the torque tube being longitudinally arcuate, a flexible tube within the torque tube, a circular saw suspended from the front end of the tube, flexible saw driving means extending through the flexible tube and connected with the saw, an engine mounted on the frame in rear of the standards, a flexible endless driving connection between the engine and the saw driving means, a handle bar extending rearwardly from the frame, controlling means mounted on the frame having a roller engaging the flexible endless drive for tightening the same and controlling transmission of rotative movement thereby, and actuating means mounted on the handle bar connected with the controlling means.

3. A portable saw including, a frame mounted on ground wheels, a pair of upstanding standards spaced longitudinally on the frame, clamps on the upper ends of the standards, a lonitudinally arcuate torque tube secured in said clamps and overhanging the front end of the frame, a circular saw suspended from the front end of the tube, flexible saw driving means extending through the tube connected with the saw, an engine mounted on the frame in rear of the standards, a belt drive between the engine and the saw driving means, a handle bar extending rearwardly from the frame, a belt tightener mounted on the frame having a pulley engaging the belt drive, actuating means mounted on the handle bar connected with the belt tightener, and means carried by the torque tube and cooperating with means carried by one of the clamps for locking the torque tube in selected angular positions.

4. A portable saw including, a frame mounted on ground wheels, a pair of upstanding standards spaced longitudinally on the frame, clamps on the upper ends of the standards, a torque tube having a straight portion and a longitudinally arcuate portion, the straight portion being secured in said clamps and the longitudinally arcuate portion overhanging the front end of the frame, a circular saw suspended from the front end of the tube, the positioning of the straight portion of the torque tube in the clamps providing for rotative adjustment of said portion in the clamps and thereby angular adjustment of the plane of the arcuate portion of the tube and the plane of cut of the saw, flexible saw driving means extending through the tube connected with the saw, an engine mounted on the frame in rear of the standards, a belt drive between the engine and the saw driving means, a handle bar extending rearwardly from the frame, a belt tightener mounted on the frame having a pulley engaging the belt drive, and actuating means mounted on the handle bar connected with the belt tightener.

5. A portable saw including, a frame mounted on ground wheels, a pair of upstanding standards spaced longitudinally on the frame one forward and one rearward of the ground wheels, clamps on the upper ends of the standards, a longitudinally arcuate torque tube secured in said clamps and overhanging the front end of the frame, the rearward end of the tube being disposed rearwardly of the ground wheels, a circular saw suspended from the front end of the tube, flexible saw driving means extending through the tube connected with the saw, an engine mounted on the frame in rear of the standards, a belt drive between the engine and the saw driving means, a handle bar extending rearwardly from the frame, a belt tightener mounted on the frame having a pulley engaging the belt drive, and actuating means mounted on the handle bar connected with the belt tightener.

JOHN C. JAQUES.